(12) United States Patent
Vollmers

(10) Patent No.: US 6,198,065 B1
(45) Date of Patent: Mar. 6, 2001

(54) RESISTANCE WELDING PROCESS AND DEVICE

(76) Inventor: Gerhard Vollmers, Lerchenstrasse 12, D-51597 Morsbach (DE)

( * ) Notice: Subject to any disclaimer, the term of this patent is extended or adjusted under 35 U.S.C. 154(b) by 0 days.

(21) Appl. No.: 09/068,129
(22) PCT Filed: Oct. 31, 1996
(86) PCT No.: PCT/EP96/04731
 § 371 Date: Nov. 9, 1998
 § 102(e) Date: Nov. 9, 1998
(87) PCT Pub. No.: WO97/17162
 PCT Pub. Date: May 15, 1997

(30) Foreign Application Priority Data

Nov. 3, 1995 (DE) .............................. 195 41 090

(51) Int. Cl.$^7$ ............................................. B23K 11/11
(52) U.S. Cl. .................................... 219/117.1; 219/89
(58) Field of Search ...................... 219/55, 61.4, 86.7, 219/117.1, 86.1, 89; 228/115

(56) References Cited

U.S. PATENT DOCUMENTS

| | | | |
|---|---|---|---|
| 3,745,297 | * | 7/1973 | Peshina .................................. 219/56 |
| 3,875,365 | * | 4/1975 | Beneteau ............................... 219/89 |
| 4,329,559 | * | 5/1982 | Kishi et al. ............................. 219/89 |
| 4,410,782 | * | 10/1983 | Kono et al. ............................ 219/89 |

FOREIGN PATENT DOCUMENTS

| | | |
|---|---|---|
| 2326921 | 10/1974 | (DE) . |
| 2915442 | 10/1980 | (DE) . |
| 3707572A1 | 9/1988 | (DE) . |
| 3612502C2 | 12/1988 | (DE) . |
| 8908048 | 10/1989 | (DE) . |
| 3841765A1 | 6/1990 | (DE) . |
| 42 01 925 A1 | * 7/1993 | (DE) . |
| 4306492C1 | 7/1994 | (DE) . |
| 4302457A1 | 8/1994 | (DE) . |
| 4012968C2 | 2/1995 | (DE) . |
| 4432573A1 | 4/1995 | (DE) . |

* cited by examiner

Primary Examiner—Clifford C. Shaw
(74) Attorney, Agent, or Firm—Townsend and Townsend and Crew LLP

(57) ABSTRACT

A resistance welding process in which the welding electrodes are moved at least via a wording piston-cylinder unit, wherein before the start of the welding process, the welding electrode is in a ready position in which it gently touches the workpiece or there is a gap in the tenth of a millimeter range between the welding electrode and the workpiece, and during the subsequent welding process pneumatic force is applied to the working piston-cylinder unit, where the maximum possible stroke of the working piston-cylinder from the position of readiness corresponds to 1 to 40 times the travel of collapsing bulges in projection welding or 1 to 120 times the penetration distance of the welding electrode in an originally hard material becoming pasty during the welding process in spot welding, or 1 to 60 times the penetration distance of the welding electrode in an originally soft material becoming pasty during the welding process in spot welding. The invention also relates to a device for implementing the process.

40 Claims, 2 Drawing Sheets

RESISTANCE WELDING PROCESS AND DEVICE

BACKGROUND OF THE INVENTION

The present invention relates to a method of resistance welding in which the welding electrode movement takes place at least by means of one working piston-cylinder unit.

Furthermore, the invention relates to a resistance welding plant with a working piston-cylinder unit for carrying out an electrode movement during the welding process.

Resistance welding is a generally known method in which, for example, two pieces of sheet metal are connected together, in that they are pressed together by two electrodes, of which at least one is movable, and fusing and subsequent solidification of the material takes place at the joint location by means of adequate electrical resistance heating through the welding current.

The quality of the welded connection is decisively influenced by how good the contact is between the electrode and the workpiece, because the contact resistances and thus the distribution of the heat produced are influenced by this contact.

The manner in which the electrode is placed onto the workpiece is thus, first of all, of significance, because if the placement movement is too rapid, the electrode rebounds so that the contact pressure force initially oscillates and the decay of this oscillation must be waited for prior to switching on the welding current, which, however, reduces the working speed in a disadvantageous manner. During spot welding rapid placement can lead to an uncontrolled high striking energy, which leads to cold deformation and rapid wear of the electrodes.

During projection welding the too rapid placement brings about an uncontrolled cold deformation of the projection prior to switching on of the welding current, and thus to an uncertain welding result.

One has hitherto attempted to regulate the speed of placement through the association of damping and restrictor valves. One has achieved a certain improvement of the placement behavior through the use of double stroke and feed stroke units.

The force responsible for the contact pressure between the electrode and the workpiece must, however, not only be made available at the start of welding but rather also during welding.

Of significance in this connection is the fact that the material to be welded becomes soft during the welding, i.e. pasty, and fuses at the joint position. When the electrode cannot be adequately quickly replenished, the force between the workpiece and the electrodes can, in unfavorable cases, reduce to such an extent that no adequate electrical contact is any longer present between the electrodes and the workpiece. This leads, having regard to the extremely high current density, to disadvantageous spray formation and premature electrode wear. If, during projection welding, the electrode is not adequately rapidly replenished, the contact pressure between the impressed projection of the one piece of sheet metal and the counter-sheet reduces, whereby the softened projection can spray away or pore formation can arise in the welding spot.

In the previously known methods, the electrode force is primarily made available during welding by single stroke cylinders, or by the working stroke of twin or feed stroke cylinders, which are, as a rule, pneumatically actuated.

SUMMARY OF THE INVENTION

It is an object of the present invention is to improve the welding of workpieces, and in particular the quality of the welding and/or the welding speed is to be increased. In this respect a rapid, precise follow-up movement of the welding electrode should be ensured during the welding procedure.

This object is satisfied in a method of the initially named kind in that the welding electrode is located prior to the start of the welding process in a position ready for use in which it gently contacts the workpiece or in which a distance in the range of tenths of millimeters exists between the welding electrode and the workpiece, and in that, during the subsequent welding procedure, a pneumatic loading of the working piston-cylinder unit takes place, with the maximum possible stroke of the working piston-cylinder unit starting from the position ready for use, corresponding to

- 1 to 40 times the follow-up movement path of the collapsing workpiece projections during projection welding, or
- 1 to 120 times the penetration path of the welding electrode into an originally hard workpiece, which becomes pasty during the welding process when spot welding, or
- 1 to 60 times the penetration path of the welding electrode into an originally soft workpiece which becomes pasty during the welding process when spot welding.

Furthermore, this object is satisfied in an apparatus of the initially named kind in that the maximum possible stroke of the working piston-cylinder unit corresponds to

- 1 to 40 times the follow-up movement path of the collapsing projections during projection welding, or
- 1 to 120 times the penetration path of the welding electrode into an originally hard workpiece, which becomes pasty during the welding process when spot welding, or
- 1 to 60 times the penetration path of the welding electrode into an originally soft workpiece which becomes pasty during the welding process when spot welding.

Both in the method of the invention and also in the plant of the invention it is of advantage

- when the maximum possible stroke of the working piston-cylinder unit corresponds, starting from the position ready for use, to 1 to 20 times, in particular 1 to 10 times, and preferably to 1 to 5 times the follow-up movement of collapsing projections during projection welding, or
- when the maximum possible stroke of the working piston-cylinder unit corresponds, starting from the position ready for use, to 1 to 60 times, in particular to 1 to 30 times, and preferably to 1 to 20 times the penetration path of the welding electrode into an originally hard material, which becomes pasty during the welding process when spot welding, or
- when the maximum possible stroke of the working piston-cylinder unit corresponds, when starting from the position ready for use, to 1 to 30 times, and in particular to 1 to 15 times, and preferably to 1 to 10 times the penetration path of the welding electrode into an originally soft material, which becomes pasty during the welding process when spot welding.

In the context of the invention it has been recognized that in the previously known arrangements the maximum possible stroke lengths of the single, twin or feed stroke cylinders are of large dimensions, so that, during the welding process, a relatively large air volume flows into the cylinder space above the working piston and is compressed, and mainly so that a larger compressed air volume must escape from the cylinder space beneath the working piston. The long airflow times which arise through this influence the follow-up movement behavior of the electrode during the welding very unfavorably.

Since, in accordance with the invention, the maximum possible stroke of the pneumatically actuated piston-cylinder unit out of the position ready for use essentially only corresponds to the required working stroke of the welding electrode for the penetration path of the spot welding electrodes into the pasty material during spot welding and/or for the follow-up movement path of the collapsing projections during projection welding, only a very small working cylinder volume has to be loaded with compressed air in order to move the working piston and thus the working electrode in the direction of the workpiece. At the same time only a very small volume beneath the working piston need be displaced out of the working cylinder.

This requires less time than the previously known methods so that the pressure relationships required for the necessary welding electrode pressure force set in very rapidly in the working piston-cylinder unit. Moreover, through the low extent of the pressure loaded volume, only a smaller compression effect has to be brought about than with larger volumina, which leads to improved force action of the electrode.

Starting from the fact that the welding electrode gently contacts the workpiece in the position ready for use, or has a spacing from the workpiece in the range of tenths or hundredths of a millimeter, an electrode movement is hardly perceptible after pneumatic loading of the working piston-cylinder unit. If now, e.g., two pieces of sheet metal with a sheet metal thickness of 2 mm each are projection welded, then for this the volume above the piston must be filled with compressed air, whereby the workpieces are pressed together by the electrode at the start of the welding process. As a result of corresponding dimensioning, the distance between the working piston and the cylinder cover associated with it amounts to only ca. 1 mm for the said welding tasks and similar welding tasks (including multiprojection welding).

Since the relatively small volume brought about by this small spacing can be filled with compressed air within a very short time, the welding current can be switched on after the expiration of only milliseconds from the actuation of the working piston-cylinder unit. This is additionally assisted by the relatively large air entry cross sections and the thereby caused good flow speeds for the compressed air.

Following the switching on of the welding current, the fusing of the projection takes place, which, with the said sheet metal thickness, has a height of ca. 1 mm, and from now on a visible electrode movement starts, which terminates after the return deformation of the projection (ca. 1 mm).

The electrode pressure is maintained for a short time for the solidification of the weld spot. Thus, for the piston path of ca. 1 mm for the entire welding process, a volume above the piston with a height of a total of ca. 2 mm must be filled, which takes place within a very short period of time and thus enables rapid follow-up movement of the electrode.

In order to be able to fully exploit the rapid pressure build up above the piston with the theoretical electrode force which results from it, the compressed air volume located beneath the piston must also be able to escape rapidly when the working piston-cylinder unit is loaded.

This is achieved in accordance with the invention in that the maximum possible stroke is kept as small as possible, and is in particular very small. Taking account of a possible machine bending, the stroke in the described embodiment amounts to ca. 2 mm. The compressed air escapes very rapidly from the relatively small volume through the air outlet cross sections, which are also made large here, and the electrode force quickly becomes fully effective.

Through the fact that the welding current is switched on within milliseconds after the loading of the working piston-cylinder unit, an uncontrolled cold deformation of the projection prior to welding is precluded. This advantage also proves to be particularly favorable in conjunction with the subsequent rapid follow-up movement of the electrode during the projection welding of aluminum and similar materials of soft form.

Provision is preferably made for the welding electrode to be returned after termination of the resistance welding into the position ready for use by pneumatic actuation of the working piston-cylinder unit.

In an alternative manner the return stroke movement of the welding electrode can, however, also take place by spring force.

The control of the compressed air for the mutual movement of the working piston-cylinder unit is preferably executed for both types of resetting using corresponding changeover valves.

A prestroke arrangement is preferably connected after the working piston-cylinder unit, by means of which the welding electrode can be moved from a starting position removed from the workpiece up to the workpiece into the position ready for use.

The prestroke arrangement can selectively be actuated pneumatically, hydraulically, by an electric motor, by muscle power, by hand, or by some other type of kinematics.

With respect to the position and direction of movement of the welding electrode the coupling of the prestroke arrangement and the working piston-cylinder unit to one another can take place in a different association.

Furthermore, the possibility exists of separating the prestroke arrangement from the working piston-cylinder unit and arranging it, in relation to the workpiece, on the opposite side of the working piston-cylinder unit. In this way the prestroke movement from the starting position into the position ready for use is executed by the counter-electrode. Subsequently, the resistance welding takes place by the loading of the working piston-cylinder unit of the invention.

The interplay between the prestroke arrangement and the working piston-cylinder unit is variably designed through corresponding program preselection of the machine sequence control. For the welding tasks which are primarily to be carried out, the workpiece is removed from the machine after the termination of the welding. As a result of this, the prestroke arrangement is also moved back, with the retraction of the working piston-cylinder unit, into the starting position for each working cycle.

When using a prestroke arrangement, the working piston-cylinder unit can be arranged between the prestroke arrangement and the welding electrode. In just the same way it is possible to arrange the prestroke arrangement between the working piston-cylinder unit and the welding electrode.

Furthermore, in certain applications, for example with hand-guided welding tongues, it can be of advantage when the electrode is moved by the working piston-cylinder unit and the counter-electrode is loaded by the prestroke arrangement.

It should, however, once again be mentioned that the prestroke arrangement can also be omitted completely, with the workpiece being pushed from the side beneath the upper welding electrode after the distance between the welding electrode has previously been set. The resistance welding then takes place through the loading of the working piston-cylinder unit of the invention.

A further advantage in comparison to the previously used methods lies in the operating mode "series spot welding". In this generally known type of resistance welding, two pieces of sheet metal are, for example, connected together by weld points, which are to be arranged closely one after the other. After each weld has been completed, the electrode is lifted from the workpiece in the tenth of a millimeter range, the workpiece is moved on further by the desired spot spacing, and the next weld is carried out. These procedures take place continuously until the execution of the last weld point.

Through the use of the method of the invention, after the insertion of the workpiece during series spot welding, the welding electrode is moved by means of the prestroke arrangement out of the starting position into the position ready for use. In the welding processes which now take place, only the working piston-cylinder unit is cycled until the last welding spot, and the prestroke arrangement moves the welding electrode back into the starting position only after termination of the welding process.

Through the volumina of the working piston-cylinder unit which are made small, the continuous pressurization and venting in each case takes place in a very short time, whereby a high welding speed and spot welds which take place rapidly one after the other are achieved.

In accordance with the invention the spacing of the welding electrode from the workpiece in the position ready for use is variable and is set accordingly prior to the start of welding. A gentle contact of the workpiece by the electrode, or a spacing between the electrode and the workpiece in the range of tenths or hundredths of a millimeter, such as is, for example, necessary for series spot welding, is preferred here. With this setting, the electrode is essentially placed onto the workpiece free of blows and jolts on being moved out of the starting position into the position ready for use.

During multiprojection welding, the advantage results that with the electrode movement from the starting position into the position ready for use the projection is pressed by an intentional amount in the range of tenths of millimeters by the placement of the large area electrode onto the workpiece. Through this the height tolerances, which are unavoidable in the pressing of the projection, are leveled out and the electrical resistances between the individual projections and the counter-sheet are equalized for the subsequent welding process. The welding result is hereby improved.

Through the rapid follow-up movement of the electrode during the welding process the method of the invention is advantageous for almost all the types of resistance welding work that are encountered.

The improved follow-up movement characteristics in accordance with the invention are also advantageous during the spot and projection welding of sheet steel with metallic coatings and with non-ferrous metals, because a lack of force-transmitting capability would in this case lead to overheating of the workpiece surface.

It should be particularly emphasized that in accordance with the invention even aluminum, aluminum alloys and similar materials of soft form can be projection welded, although one is concerned with materials in which the transition from the solid state into the pasty or liquid state takes place within a very short space of time. This physical characteristic presupposes a particularly rapid follow-up movement of the welding electrode during the welding. In this respect it is no longer necessary (as previously) to press the projections with increased strength and special shapes into the sheet aluminum, but rather the round projection customary during steel welding is sufficient.

Through the small air volumes of the working piston-cylinder unit on both sides of the piston, the advantage furthermore results that with a pressure change the desired electrode force change sets in very rapidly, i.e. in the millisecond range.

The change of pressure can be carried out with the generally customary techniques of pressure program resistance welding. This method advantageously brings additional advantages during many resistance welding tasks, especially during the projection welding and spot welding of aluminum. The pore formation within the weld spot is reduced through a pressure program or also a current pressure program, in which the electrode force is preferably increased towards the end of the welding procedure.

The resistance welding plant of the invention can, for example, be a C-shaped stand machine, a portal machine, a multi-cylinder welding plant, hand-guided welding tongues in scissors or C-shape, robot-guided welding tongues in scissor or C-shape, or can also be any other resistance welding plant. The resistance welding plant can be equipped with one of the different current types in accordance with the prior art.

In a preferred embodiment the working piston-cylinder unit is formed as a closed, classical cylinder with an associated cylinder cover and cylinder base. In this way the same working stroke is, in particular, available in each position ready for use, which is determined by the position of the prestroke arrangement.

The sealing of the piston of the working piston-cylinder unit relative to the air volumes present at both sides (cylinder cover side and cylinder base side) and also the sealing of the piston rod within the cylinder base can, for example, take place via sliding seals or through membranes of rubber or similar materials.

Through the very small maximum possible stroke of the invention for the working piston-cylinder unit, the cylinder function is considerably more reliable if the piston and piston rods are sealed by membranes and the wear of the membranes is lower than with the previously, sometimes used roll membrane cylinders.

The prestroke arrangement includes, in a preferred embodiment of the invention, a spindle which can be energized by an electric motor and which runs in the prestroke direction, and a threaded element which is moved by the spindle and connected to the working piston-cylinder unit. With this prestroke arrangement the position of the welding electrode ready for use can be set in a simple manner in that the electric motor is actuated until the welding electrode has reached the desired position ready for use.

This permits a particularly convenient setting of the electrode spacing from the workpiece in the position ready for use, for example through a numerical control.

A plant in accordance with the invention can further include at least one working piston-cylinder unit formed as a twin piston or multiple piston arrangement. In this manner the electrode force is increased. When, in this arrangement, the working piston-cylinder unit is executed as a twin piston or multiple piston arrangement, then the maximum possible stroke of each working piston-cylinder unit is executed in accordance with the invention.

DESCRIPTION OF THE PREFERRED EMBODIMENTS

Figure 1:
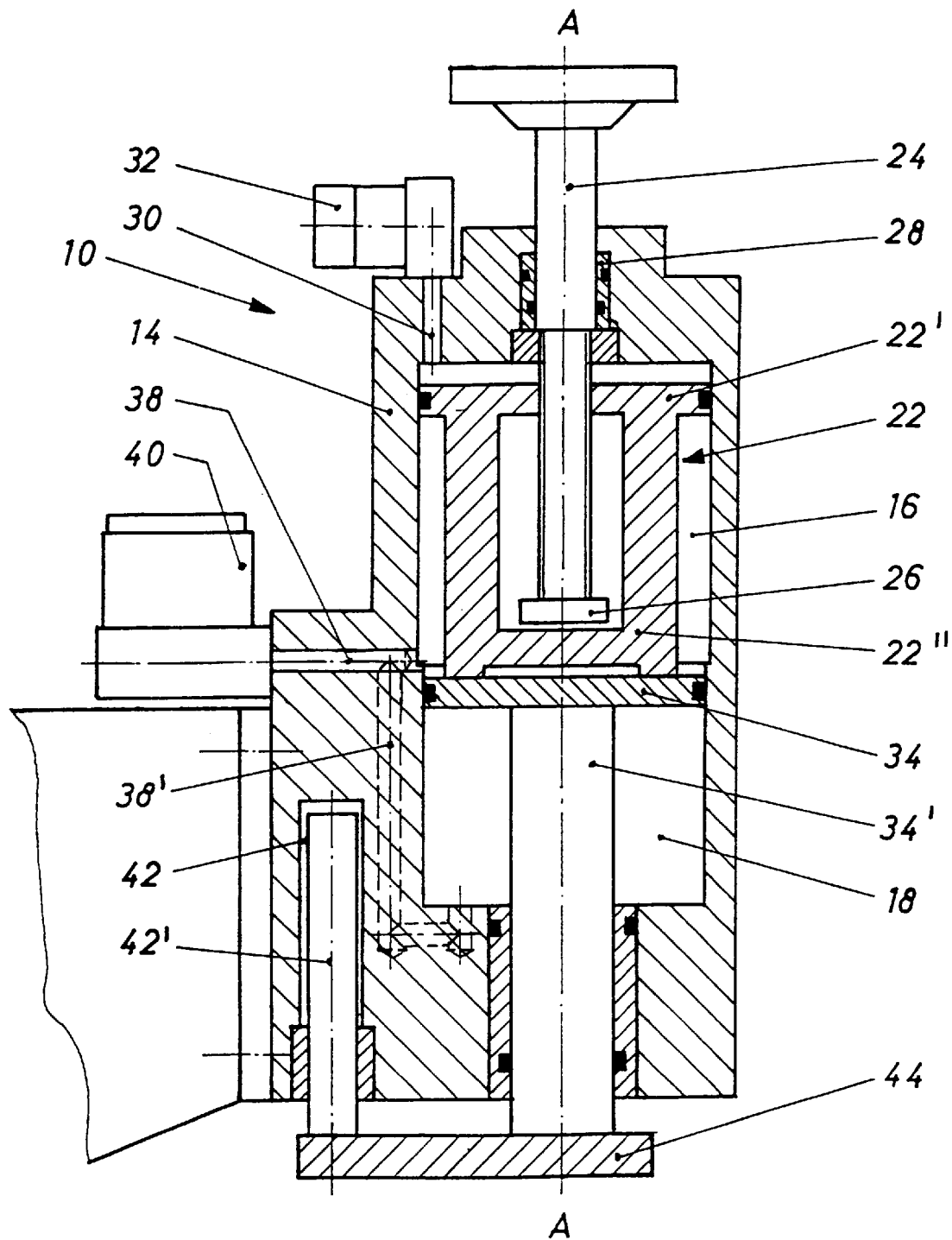
FIG. 1 shows a double stroke cylinder which can be operated in accordance with the resistance welding method of the invention.

In FIG. 1 an electrode force unit 10, for the execution of the method of the invention, is schematically shown, close to its starting position in which a welding electrode (not shown) which is to be secured to the connection plate 44 is essentially fully retracted from a workpiece to be welded (not shown).

The electrode force unit 10 comprises a housing 14 in which a prestroke cylinder bore 16 and a working cylinder bore 18 are provided on a common axis A—A.

In the prestroke cylinder bore 16 there is sealingly and slidingly arranged a prestroke piston 22 with a prestroke piston flange 22' at the side remote from the workpiece and a hollow prestroke piston rod 22" closed at the workpiece side. An abutment 26, which is broadened at the workpiece side, on a setting, spindle or adjustment 24 passes through the prestroke piston flange 22' into the piston rod 22" to restrict the prestroke piston movement in the direction towards the workpiece. The abutment 26 is connected for its positioning to the adjustment spindle 24 via a pressure, tight lead-through 28.

A through-way 30 for a fluid under pressure, such as compressed air, is provided in the housing 14 above the prestroke piston flange 22', in order to connect the interior of the housing 14 via a pressure fluid valve 32, to a pressure fluid source (not shown), for example to a compressed air source. The pressure of the pressure fluid is so selected that the desired force arises with the preset diameters of the piston. For this purpose a pressure of 1 to 6 bar can be required with customary diameters.

At its side facing the workpiece the prestroke piston rod 22' sits in the starting position on a working piston 34, which is sealingly slidingly arranged in the working cylinder bore 18, with a working piston rod 34' being secured to the lower side of the working piston.

Above the working piston 34, but still below the lower edge of the prestroke piston flange 22' even with the fully lowered prestroke piston 22, there is provided a further through-opening 38 for compressed air, via which a second valve 40 can introduce compressed air into the working cylinder 18.

To the side of the housing 14 there is provided a guide bore 42 parallel to the axis A—A, in which a guide rod 42' is slidingly received, which is connected via a connection plate 44 to the piston rod 34' which emerges out of the housing 14 in order to prevent a rotation of the working piston 34. The electrode force unit 10 is operated in accordance with the invention as follows:

First of all, the prestroke piston abutment 26 is adjusted on the adjustment spindle 24 so that the welding electrode is moved closely up to the workpiece to be welded, when the prestroke piston 22 is energized with pressure fluid via the compressed air valve 32 and the compressed air inlet opening 30 above the prestroke piston flange 22', in order to move the working piston 34 and the working piston rod 34' with the welding electrode in the direction of the workpiece.

The position ready for use is in this way precisely selected in accordance with the invention by setting of the adjustment spindle 24 and thus of the abutment 26, so that the working piston 34 can only move via a stroke in the working cylinder 18, which corresponds essentially to the required working stroke of the welding electrode, but is at the same time preferably at least sufficiently large that the working piston 34 does not strike the limit within the working cylinder 18 on follow-up movement of the welding electrode.

In accordance with the setting of the abutment in accordance with the invention the prestroke arrangement is moved by a corresponding opening of the valve 32 from the starting position into the position ready for use.

In order to shift the welding electrode from the position ready for use further in the direction towards the workpiece, compressed air is then fed into the working cylinder 18 via the second valve 40 and the passage opening 38. Since only a very small working cylinder volume is to be filled with compressed air, and since only a small stroke is to be executed, the electrode movement takes place very rapidly.

After the electrode presses against the workpiece to be welded, the current can be switched on for the welding time that is provided, or for a predetermined number of mains cycles. The workpiece material which is softened by the welding current yields under the force of the electrode, whereby the electrode moves slightly. This leads to the working piston 34 being shifted further in its working cylinder 18 in the direction towards the workpiece, which brings about a short term reduction of the contact pressure force, with which the welding electrode is pressed onto the workpiece, because the working piston 34 which follows the yielding workpiece must, on the one hand, displace air, and, on the other hand, the volume above the working piston 34 is increased, i.e. the pressure prevailing in the working cylinder is reduced at least until compressed air has flowed in from the compressed air source. Only when this has taken place does the electrode force correspond again to its starting value.

This is a problem which exists both in the prior art and also with the invention. However, only a small volume corresponding to a very small stroke is present beneath the working piston 34 of the invention, which is why, in accordance with the invention, these processes, which are necessary for the follow-up movement, take place very much more rapidly than when operating customary electrode force units, whereby the problem that has been addressed is practically overcome by the invention.

After the welding current has flowed through the workpiece for the predetermined time, switching off takes place. The electrode is preferably held for a predetermined further holding time on the workpiece in order to press the workpieces together during the solidification or cooling of the weld position.

Thereafter the welding electrode can be moved back into the position ready for use. For this purpose the second valve 40 is first switched. Then the working piston 34 is either pneumatically energized in the direction away from the workpiece via through openings 38', or, for example, is shifted by a compression spring. At the same time the compressed air above the working piston escapes.

Insofar as a plurality of weld positions are to be welded one after the other on a workpiece, such as for example in the operating mode "series spot welding", then the workpiece can be moved beneath the welding electrode which is located in the position ready for use. The electrode can then be started for a new welding process. Since the working piston only needs to move over a small stroke in the working cylinder, and a more rapid pressure, build up can take place, a significantly increased step sequence is possible with this arrangement.

Although the principle of an electrode force unit in accordance with the invention can be realized in accordance with FIG. 1, changes are possible in order to improve the operation in accordance with the invention. Thus the prestroke piston rod 22' can, for example, extend close to the lateral prestroke cylinder wall. Since the volume between the prestroke piston rod 22" and the prestroke cylinder wall communicates with the working cylinder 18, the working cylinder volume, which has to be filled, is further reduced and the follow-up movement behavior is improved.

Figure 2:
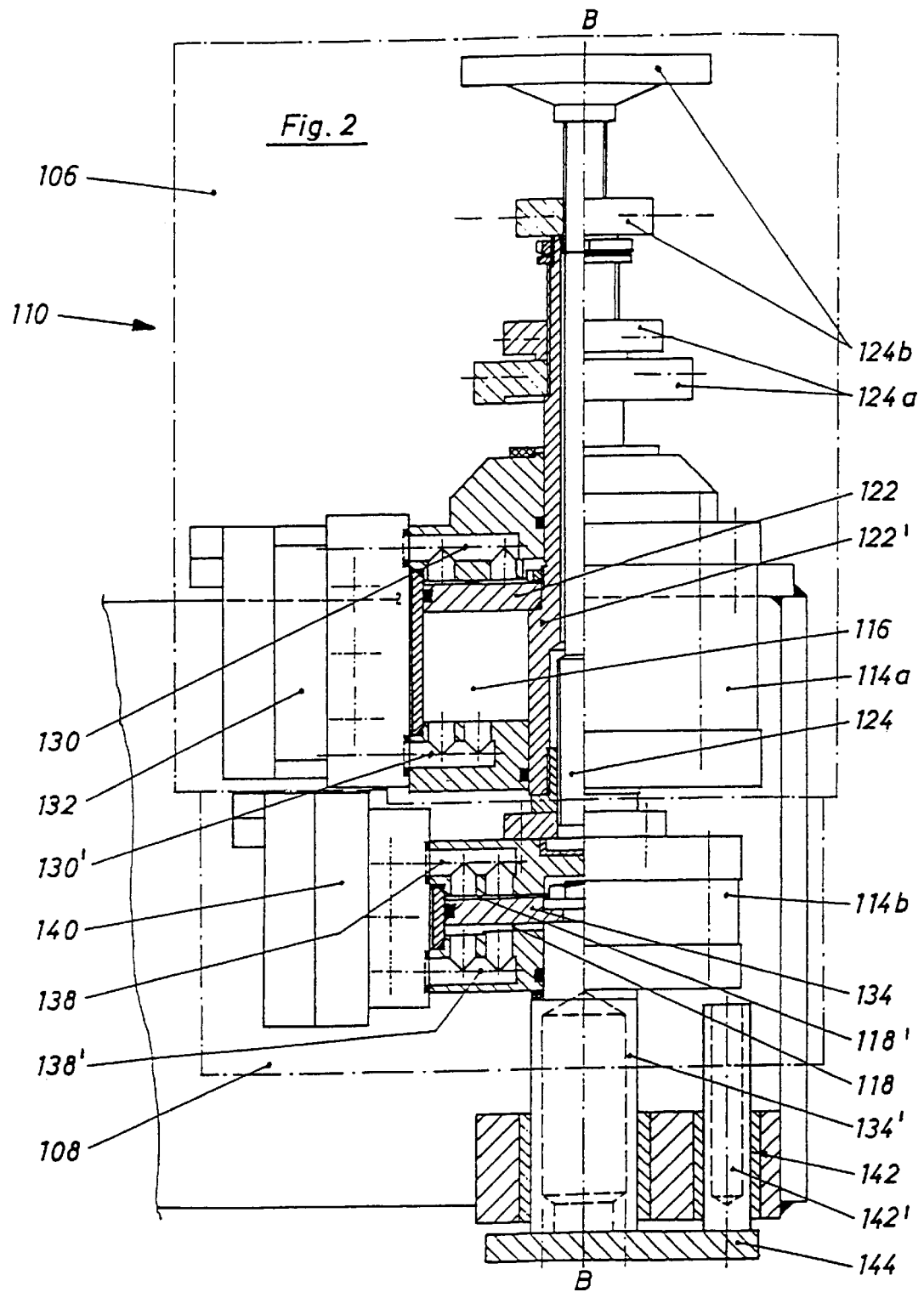
FIG. 2 shows an electrode force unit in accordance with the invention for a resistance welding plant in accordance with the present invention.

A further arrangement in accordance with the invention is shown in FIG. 2 in which, for similar parts, the same reference numerals are used as in FIG. 1, but with a prefix 1.

In accordance with FIG. 2 an electrode force unit 110 includes a prestroke arrangement 106 with a first housing 114a and a working piston-cylinder unit 108 connected after it and having a second housing 114b separate from the first. The housings 114a and 114b each comprise a cylinder cover, a cylinder jacket and a cylinder base.

A prestroke cylinder space 116 is provided in the housing 114a of the prestroke arrangement, and a prestroke piston 122, which is sealingly slidable for the movement over large prestroke paths, along the axis of movement B—B is received in the prestroke cylinder space 116. The prestroke piston 122 is secured to a piston rod 122', which is led out of the housing 114a at both sides in the direction of the axis of movement B—B.

Pressure fluid through-ways 130, 130' are provided in the housing 114a above and below the piston 122 and are selectively connected to a pressure fluid source, such as a compressed air source, via a pressure fluid changeover valve 132. The diameter of the prestroke arrangement and the pressure of the fluid are so matched to one another that the required electrode force is achieved.

At the side (at the top of FIG. 2) of the prestroke piston rod 122' remote from the welding electrode (not shown) there is provided an adjustable counter-nut arrangement 124a for the coarse restriction of the prestroke piston movement in the prestroke cylinder 116.

The prestroke piston rod 122' is provided with a bore which extends along the axis B—B, through which a fine adjustment spindle 124, which can be locked by the locking element 124b, is guided beyond the workpiece end (at the bottom in FIG. 2) of the piston rod 122'. The housing 114b of the working piston-cylinder unit is secured to the workpiece end of the fine adjustment spindle 124.

In the housing 114b there is provided a cylinder space 118 for the reception of a working piston 134, which can be slidingly and sealingly moved therein over a short stroke along the axis B—B. The working piston 134 is secured to a working piston rod 134', which, for example, emerges through a rolling or sliding bearing in the direction of the workpiece. In the end position of the working piston 134 remote from the workpiece, i.e. in the position ready for use, there is provided a small air distribution gap 118' between the working piston 134 and the working cylinder 118. A connection plate 144 which connects the working piston 134 to a guide rod 142' guided in a guide bore 142 is preferably mounted outside of the housing 114b to the working piston rod 134'. The guide rod 142' prevents a rotation of the (not shown) electrode coupled to the connection plate 144.

Compressed air supply and discharge lines 138 and 138' are provided in the housing 114b, which can optionally energize the working piston 134 from both directions with compressed air from a compressed air source via a compressed air changeover valve 140. The diameter of the working piston 134 and a compressed air pressure are matched to one another for the required electrode force. The diameter of the working piston 134, i.e. of the associated working cylinder space 118, is preferably smaller than the diameter of the corresponding elements of the prestroke piston arrangement 106.

It is important in this arrangement that with a given diameter of the cylinder space 118 the volume above and below the working piston 134 is kept as small as possible. This is achieved in that the maximum possible stroke of the working piston 134 is kept small. Thus, by way of example, provision can be made for the working piston 134 and the working cylinder 118 to have a stroke of only about 2 mm in the position ready for use, in the direction towards the workpiece, and to have an air distribution gap 118' of approximately 1 mm available away from the workpiece, whereas, in comparison to this, the maximum possible prestroke can, for example, include the range from a few tens of millimeters to a few hundred millimeters.

The electrode force unit 110 of the invention in accordance with FIG. 2 is operated as follows:

First of all, the desired prestroke is roughly preset at the lock nut 124a.

Then compressed air is applied via the pressure changeover valve 132 via the compressed air opening 130 remote from the workpiece in order to shift the welding electrode through a prestroke movement out of its starting position into the roughly set position ready for use, with the air which is still present beneath the prestroke piston 122 in the prestroke cylinder 116 being displaced through the openings 130'.

If the welding electrode is located in the roughly set position ready for use, then the desired position ready for use in which the welding electrode is located closely above the workpiece or gently contacts the workpiece can be precisely set at the fine adjustment spindle 124b.

The fine adjustment spindle 124b can also be reset to the extent that with multiprojection welding, in particular round projection welding, such as of aluminum or its alloys, the projections can be intentionally cold deformed in the submillimeter range and contact the electrodes through the prestroke movement.

Subsequently, through corresponding control of the valve 140 which can be changed over, the working piston 134 can be loaded in the direction of the workpiece to be welded until the welding electrode presses against the workpiece. The filling and venting of the cylinder volume takes place in a very short time.

Subsequently, the welding current which is provided can be switched on. When the material to be welded thereby becomes soft, the electrode together with the working piston 134 execute a follow-up movement.

The large cross-sections of the working cylinder pressure supply and discharge lines and the low working cylinder volume enable a very precise follow-up guidance. The compressibility of the quantity of gas contained in the working cylinder 118, which is only very small because of the small volume, also contributes to this.

After the welding has been terminated, and the post holding time has elapsed, the pressure valve 140 associated with the working piston-cylinder unit 108 is changed over and the double acting working piston 134 is pneumatically moved away from the workpiece.

Insofar as further welds are to be effected on the same workpiece, such as for example in the operating mode "series spot welding" the next weld position can be moved under the welding electrode in the position ready for use and the welding process is repeated. After the conclusion of the desired number of welds, the welding electrode is first retracted by a retraction stroke of the working piston into the position ready for use, and is then moved back into the starting position by a changeover of the prestroke valve 132.

With the apparatus of the invention a rebound of the welding electrode during contact can be largely avoided. Moreover, the follow-up movement is improved to the extent that the round projection welding of aluminum and aluminum alloys is now also possible. Moreover, in the operating mode "series spot welding" a stroke sequence can be achieved which is almost an order of magnitude faster than in the arrangements in accordance with the prior art.

Whereas the housing 114*b* of the working piston-cylinder unit 108 is connected via the fine adjustment spindle 124 to the prestroke arrangement 106 in the illustrated electrode force unit 110, other types of connection in series are also possible. Thus, for example, the working piston 134 can be connected to the prestroke arrangement 106, with the welding electrode then being secured to the now moved housing 114*b*.

Furthermore, one further or a plurality of such units can be connected after the illustrated working piston-cylinder unit 108 to increase the electrode force. Of importance in this respect is the fact that the stroke which is possible in a working piston-cylinder unit 108, and thus also the corresponding volume, is kept as small as possible.

Whereas the electrode force unit 110 explained by way of example has a pneumatically actuated prestroke arrangement, it is also possible in place of this to, for example, hydraulically actuate the described working piston-cylinder unit or to mount a prestroke arrangement on a threaded element, which can be shifted on a spindle turned by an electric motor.

What is claimed is:

1. Method for resistance welding a workpiece in which a welding electrode is moved relative to the workpiece by means of at least one working piston-cylinder unit comprising the steps of locating the welding electrode prior to welding in a position ready for use in which the workpiece gently contacts the workpiece or there is a distance in the range of tenths of millimeters between the welding electrode and the workpiece, pneumatically loading the working piston-cylinder unit to contact the workpiece with the electrode, and welding the workpiece while the piston-cylinder unit is loaded, the step of pneumatically loading comprising limiting a maximum possible stroke of the working piston-cylinder unit from the position ready for use to one of
   1 to 40 times a follow-up movement path of collapsing workpiece projections during projection welding,
   1 to 120 times a penetration path of the welding electrode into an originally hard workpiece during spot welding when the hard workpiece becomes pasty, and
   1 to 60 times a penetration path of the welding electrode into an originally soft workpiece during spot welding when the soft workpiece becomes pasty.

2. Method in accordance with claim 1 wherein the maximum possible stroke of the working piston-cylinder unit corresponds, starting from the position ready for use, to 1 to 20 times a follow-up movement path of collapsing workpiece projections during projection welding.

3. Method in accordance with claim 1 wherein the maximum possible stroke of the working piston-cylinder unit corresponds, starting from the position ready for use, to 1 to 60 times the penetration path of the welding electrode into an originally hard material which becomes pasty during spot welding.

4. Method in accordance with claim 1 wherein the maximum possible stroke of the working piston-cylinder unit corresponds, when starting from the position ready for use, to 1 to 30 times the penetration path of the welding electrode into an originally soft material which becomes pasty during spot welding.

5. Method in accordance with claim 1 including providing a prestroke arrangement and coupling it to the working piston-cylinder unit, and moving the welding electrode with the prestroke arrangement from a starting position where the electrode is remote from the workpiece into the position ready for use.

6. Method in accordance with claim 5 including pneumatically actuating the prestroke arrangement.

7. Method in accordance with claim 5 including hydraulically actuating the prestroke arrangement.

8. Method in accordance with claim 5 including actuating the prestroke arrangement with an electric motor.

9. Method in accordance with claim 1 including retracting the welding electrode with the working piston-cylinder unit into the position ready for use after termination of the resistance welding.

10. Method in accordance with claim 1 including retracting the welding electrode by means of a spring force into the position ready for use after the termination of the resistance welding.

11. Method in accordance with claim 1 including supplying compressed air for the working piston-cylinder unit and using changeover valves for controlling the compressed air.

12. Method in accordance with claim 1 wherein the electrode is movable between the position ready for use and a starting position remote from the workpiece, and including, following completion of each welding step, moving the electrode into the starting position.

13. Method in accordance with claim 1 including, during series spot welding, returning the electrode after each executed individual spot weld into the position ready for use, and wherein each individual spot weld is executed from the position ready for use after a corresponding relative movement of the workpiece by actuating the working piston-cylinder unit.

14. Method in accordance with claim 1 including setting a spacing of the welding electrode from the workpiece in the position ready for use with an adjustment device.

15. Method in accordance with claim 1 including moving the electrode from a starting position remote from the workpiece to the position ready for use until a gentle contact between the workpiece and the electrode takes place, or there is a spacing in the range of tenths of millimeters between the electrode and the workpiece so that the electrode is placed onto the workpiece essentially free from blows and jolts when being moved from the starting position into the position ready for use.

16. Method in accordance with claim 1 including, during multiprojection welding, uniformly deforming the projections in the range of tenths of millimeters by placing the welding electrode onto the workpiece prior to welding.

17. Method in accordance with claim 1 wherein the workpiece is made of aluminum or aluminum alloys, and including impressing round projections into the workpieces.

18. A method according to claim 1 including providing a prestroke arrangement and coupling it to the working piston-cylinder unit, placing the working piston-cylinder unit and the prestroke arrangement in separate first and second housings, moving the electrode from a starting position where the electrode is remote from the workpiece to the position ready for use by flowing a fluid medium into the second housing to thereby actuate the prestroke arrangement, and directing a fluid medium into the first housing to thereby activate the working piston-cylinder unit and move the working electrode from the position ready for use into a welding position in which the electrode is biased against the workpiece.

19. Resistance welding plant comprising a working piston-cylinder unit for moving a welding electrode during a welding process, the working piston-cylinder unit providing a maximum possible stroke for moving the electrode relative to the workpiece from a position in which the electrode is ready for use into a welding position for performing the welding process with the electrode, the maximum possible stroke corresponding to one of 1 to 40 times a resetting path of collapsing workpiece projections during projection welding, 1 to 120 times a penetration path of the welding electrode into an originally hard workpiece during spot welding when the hard workpiece becomes pasty, and 1 to 60 times a penetration path of the welding electrode into an originally soft workpiece during spot welding when the soft workpiece becomes pasty.

20. Plant in accordance with claim 19 wherein the maximum possible stroke of the working piston-cylinder unit corresponds to 1 to 20 times a follow-up movement path of collapsing projections during projection welding.

21. Plant in accordance with claim 19 wherein the maximum possible stroke of the working piston-cylinder unit corresponds to 1 to 60 times the penetration path of the welding electrode into an originally hard workpiece which becomes pasty during spot welding.

22. Plant in accordance with claim 19 wherein the maximum possible stroke of the working piston-cylinder unit corresponds to 1 to 30 times the penetration path of the welding electrode into an originally soft workpiece which becomes pasty during spot welding.

23. Plant in accordance with claim 19 including a prestroke arrangement coupled to the working piston-cylinder unit, the prestroke arrangement moving the welding electrode from a starting position which is remote from the workpiece into the position ready for use.

24. Plant in accordance with claim 23 wherein the prestroke arrangement is formed as a pneumatically activated prestroke piston/prestroke cylinder unit.

25. Plant in accordance with claim 24 including a fixed or adjustable abutment provided at the prestroke arrangement for controlling prestroke movements.

26. Plant in accordance with claim 25 including a fine adjustment device provided at the prestroke arrangement for the fine adjustment of a spacing between the workpiece and the welding electrode in the position ready for use, the fine adjustment device being independent of the position of the prestroke piston in the prestroke cylinder.

27. Plant in accordance with claim 26 wherein the fine adjustment device has an adjustment spindle which is coupled to the prestroke arrangement and can be locked by a counter-nut, the adjustment spindle being coupled to the working piston-cylinder unit and movable jointly therewith.

28. Plant in accordance with claim 23 wherein the prestroke arrangement includes a spindle which extends in the prestroke direction and which can be actuated by an electric motor, and a threaded element which is connected to the working piston-cylinder unit and movable by the electric motor.

29. Plant in accordance with claim 23 wherein the working piston-cylinder unit is arranged between the prestroke arrangement and the welding electrode.

30. Plant in accordance with claim 23 wherein the plant includes a counter-electrode which cooperates with the welding electrode during the welding process, and wherein the electrode is actuated by the working piston-cylinder unit and the counter-electrode is actuated by the prestroke arrangement.

31. A welding plant in accordance with claim 23 wherein the prestroke arrangement is arranged between the working piston-cylinder unit and the welding electrode.

32. Plant in accordance with claim 19 wherein the working piston-cylinder unit comprises a double acting cylinder.

33. Plant in accordance with claim 19 wherein the working piston-cylinder unit includes a piston defining first and second air volumes on respective sides of the piston which are sealed from each other.

34. Plant in accordance with claim 19 including means for pneumatically activating the working piston-cylinder unit.

35. Plant in accordance with claim 19 including a spring generating a force for moving the welding electrode away from the workpiece after termination of the welding process.

36. Plant in accordance with claim 19 wherein the working piston-cylinder unit is energized with compressed air, and including at least one changeover valve for controlling the air.

37. Plant in accordance with claim 19 wherein at least one piston-cylinder unit is formed as a multi-piston arrangement for increasing a force acting on the electrode.

38. Plant in accordance with claim 37 wherein the prestroke arrangement has a hydraulically actuated prestroke piston-cylinder unit.

39. Plant in accordance with claim 19 wherein the working piston-cylinder unit includes a piston rod, and wherein the piston rod of at least one working piston-cylinder unit is guided in a rolling bearing or sliding bearing.

40. A welding plant for resistance welding a workpiece with a welding electrode, the plant comprising a working piston-cylinder unit for moving the electrode during welding, a prestroke arrangement coupled to the working piston-cylinder unit for moving the welding electrode from a starting position remote from the workpiece into a position ready for use at which the welding electrode is proximate the workpiece, a first housing for the prestroke arrangement, and a second housing separated from the first housing for the working piston-cylinder unit, a ratio between a maximum possible stroke of the prestroke arrangement to a maximum possible stroke of the working piston-cylinder unit being at least 5:1, and wherein a maximum possible stroke of the working piston-cylinder unit from the position ready for use is limited to one of 1 to 40 times a follow-up movement path of collapsing workpiece projections during projection welding, 1 to 120 times a penetration path of the welding electrode into an originally hard workpiece during spot welding when the hard workpiece becomes pasty, and 1 to 60 times a penetration path of the welding electrode into an originally soft workpiece during spot welding when the soft workpiece becomes pasty.

* * * * *